(12) United States Patent
Ikeda et al.

(10) Patent No.: US 11,329,276 B2
(45) Date of Patent: May 10, 2022

(54) CATHODE MIXTURE, ALL SOLID STATE BATTERY, AND METHOD FOR PRODUCING CATHODE MIXTURE

(71) Applicant: TOYOTA JIDOSHA KABUSHIKI KAISHA, Toyota (JP)

(72) Inventors: Yuki Ikeda, Toyota (JP); Masafumi Nose, Susuno (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 55 days.

(21) Appl. No.: 16/687,886

(22) Filed: Nov. 19, 2019

(65) Prior Publication Data

US 2020/0168897 A1 May 28, 2020

(30) Foreign Application Priority Data

Nov. 27, 2018 (JP) .............................. JP2018-221248

(51) Int. Cl.
*H01M 4/13* (2010.01)
*H01M 4/36* (2006.01)
*H01M 4/58* (2010.01)
*H01M 4/62* (2006.01)
*H01M 4/02* (2006.01)

(52) U.S. Cl.
CPC ......... *H01M 4/364* (2013.01); *H01M 4/5815* (2013.01); *H01M 4/5825* (2013.01); *H01M 4/625* (2013.01); *H01M 2004/028* (2013.01)

(58) Field of Classification Search
CPC .... H01M 4/364; H01M 4/5825; H01M 4/625; H01M 2004/028
See application file for complete search history.

(56) References Cited

U.S. PATENT DOCUMENTS

| | | | |
|---|---|---|---|
| 9,865,873 B2 | 1/2018 | Nagata et al. |
| 2010/0151335 A1 | 6/2010 | Senga et al. |
| 2012/0301778 A1 | 11/2012 | Trevey et al. |
| 2013/0040208 A1 | 2/2013 | Kanno et al. |
| 2015/0162614 A1 | 6/2015 | Koshika et al. |
| 2016/0118660 A1 | 4/2016 | Nagata et al. |
| 2016/0351964 A1 | 12/2016 | Jeong et al. |
| 2017/0317337 A1 | 11/2017 | Hayashi et al. |
| 2017/0317381 A1 | 11/2017 | Kim et al. |

(Continued)

FOREIGN PATENT DOCUMENTS

| | | |
|---|---|---|
| CN | 102823049 A | 12/2012 |
| CN | 105308774 A | 2/2016 |

(Continued)

OTHER PUBLICATIONS

Office Action dated Jan. 25, 2021, issued by the U.S. Patent and Trademark Office in U.S. Appl. No. 16/420,418.

(Continued)

*Primary Examiner* — Jane J Rhee
(74) *Attorney, Agent, or Firm* — Sughrue Mion, PLLC

(57) ABSTRACT

A main object of the present disclosure is to provide a cathode mixture with good rate property. The present disclosure achieves the object by providing a cathode mixture comprising: a solid solution of a sulfur simple substance, $P_2S_5$ and $Li_3PO_4$, and a conductive auxiliary material, and a molar ratio of the $Li_3PO_4$ to the $P_2S_5$ is 0.05 or more and 0.67 or less.

4 Claims, 3 Drawing Sheets

(56) References Cited

U.S. PATENT DOCUMENTS

| | | |
|---|---|---|
| 2018/0069262 A1 | 3/2018 | Utsuno et al. |
| 2019/0051890 A1 | 2/2019 | Nose |
| 2019/0372104 A1 | 12/2019 | Masafumi |
| 2019/0372105 A1 | 12/2019 | Nose |
| 2019/0372106 A1 | 12/2019 | Nose |
| 2019/0372107 A1 | 12/2019 | Masafumi et al. |

FOREIGN PATENT DOCUMENTS

| | | |
|---|---|---|
| JP | 2011-29139 A | 2/2011 |
| JP | 2011-181260 A | 9/2011 |
| JP | 2012-69305 A | 4/2012 |
| JP | 5388069 B2 | 1/2014 |
| JP | 5445809 B1 | 3/2014 |
| JP | 2014-160572 A | 9/2014 |
| JP | 2015-5452 A | 1/2015 |
| JP | 2015-176849 A | 10/2015 |
| JP | 2017-84686 A | 5/2017 |
| JP | 2017-091810 A | 5/2017 |
| JP | 2017-168434 A | 9/2017 |
| JP | 2019-33067 A | 2/2019 |
| JP | 2019-212444 A | 12/2019 |
| JP | 2019-212615 A | 12/2019 |
| WO | 2011/118801 A1 | 9/2011 |
| WO | 2016/063877 A1 | 4/2016 |

OTHER PUBLICATIONS

N. Tanibata, et al., "A novel discharge-charge mechanism of a S-$P_2S_5$ composite electrode without electrolytes in all-solid-state Li/S batteries", Journal of Materials Chemistry A, 2017, p. 11224-11228, vol. 5 (and 3-page Experimental supplementary information (ESI): Details of cell preparation, characterization).

Office Action dated Aug. 3, 2020, issued by the U.S. Patent and Trademark Office in U.S. Appl. No. 16/420,418.

Han Ul Choi et al: "Performance Improvement of all-solid-state Li—S batteries with optimizing morphology and structure of sulfur composite electrode", Journal of Alloys and Compounds vol. 723, Jun. 14, 2017, pp. 787-794.

Kota Suzuki et al.: "Composite Sulfur Electrode for All-Solid-State Lithium-sulfun Battery with LiS—GeS2—P2S5-based Thio LISICON Solid Electrolyte", Electrochemistry, vol. 86, No. 1, Dec. 27, 2017, pp. 1-5.

Office Action dated Sep. 28, 2021, issued by the U.S. Patent and Trademark Office in U.S. Appl. No. 16/040,216.

Advisory Action dated Mar. 1, 2021, issued by the U.S. Patent and Trademark Office in U.S. Appl. No. 16/040,216.

Final Office Action dated Oct. 23, 2020, issued by the U.S. Patent and Trademark Office in U.S. Appl. No. 16/040,216.

Office Action dated May 1, 2020, issued by the U.S. Patent and Trademark Office in U.S. Appl. No. 16/040,216.

Restriction Requirement dated Feb. 12, 2020, issued by the U.S. Patent and Trademark Office in U.S. Appl. No. 16/040,216.

Office Action dated Jan. 31, 2022 in U.S. Appl. No. 16/040,216.

CATHODE MIXTURE, ALL SOLID STATE BATTERY, AND METHOD FOR PRODUCING CATHODE MIXTURE

TECHNICAL FIELD

The present disclosure relates to a cathode mixture.

BACKGROUND ART

In accordance with the rapid spread of information-related apparatuses and communication devices such as a personal computer, a video camera, and a portable telephone in recent years, the development of a battery used for the power source thereof is regarded as important. Also in the automobile industry, the development of a battery with high out-put and high capacity for electric vehicles or hybrid vehicles is in progress.

The development of a sulfur battery using sulfur as a cathode active material is in progress. The sulfur has a feature that the theoretical capacity thereof is extremely high as 1675 mAh/g. Non-Patent Literature 1 discloses that a cathode mixture is produced by conducting mechanical milling to a mixture of sulfur simple substance (S), $P_2S_5$, and Ketjen black.

Also, Patent Literature 1 discloses a cathode mixture comprising sulfur and/or its corona product, an ion conductive material, and an activated carbon covered with a conductive material. Also, Patent Literature 2 discloses an all solid secondary battery using $Li_2S$—LiI—LiBr or $Li_2S$—LiI as a cathode active material.

CITATION LIST

Patent Literatures

Patent Literature 1: Japanese Patent Application Laid-Open (JP-A) No. 2015-176849
Patent Literature 2: International Publication No. WO2016/063877

Non-Patent Literature

Non-Patent Literature 1: N. Tanibata et al., "A novel discharge-charge mechanism of a S—P2S5 composite electrode without electrolytes in all-solid-state Li/S batteries", J. Mater. Chem. A, 2017 5 11224-11228

SUMMARY OF DISCLOSURE

Technical Problem

Higher performance of a battery has been required. The present disclosure has been made in view of the above circumstances, and a main object thereof is to provide a cathode mixture with good rate property. Incidentally, the rate property in the present disclosure signifies capacitance property when discharged at relatively high rate.

Solution to Problem

The present disclosure provides a cathode mixture comprising: a solid solution of a sulfur simple substance, $P_2S_5$ and $Li_3PO_4$, and a conductive auxiliary material, and a molar ratio of the $Li_3PO_4$ to the $P_2S_5$ is 0.05 or more and 0.67 or less.

According to the present disclosure, since the cathode mixture comprises the solid solution of a sulfur simple substance, $P_2S_5$ and $Li_3PO_4$, and further, the molar ratio of $Li_3PO_4$ to $P_2S_5$ is in the specific range, the rate property of the cathode mixture may be improved.

In the disclosure, the cathode mixture may comprise a carbon material as the conductive auxiliary material The present disclosure also provides an all solid state battery comprising a cathode layer, a solid electrolyte layer, and an anode layer in this order, and the cathode layer includes a solid solution of a sulfur simple substance, $P_2S_5$ and $Li_3PO_4$, and a conductive auxiliary material, and a molar ratio of the $Li_3PO_4$ to the $P_2S_5$ is 0.05 or more and 0.67 or less.

According to the present disclosure, since the cathode layer comprises the solid solution of a sulfur simple substance, $P_2S_5$ and $Li_3PO_4$, and further, the molar ratio of $Li_3PO_4$ to $P_2S_5$ is in the specific range, the rate property of the all solid state battery may be improved.

The present disclosure also provides a method for producing a cathode mixture, the method comprising steps of: a preparing step of preparing a raw material mixture including a sulfur simple substance, $P_2S_5$, $Li_3PO_4$, and a conductive auxiliary material, and a mechanical milling step of conducting mechanical milling to the raw material mixture, and a molar ratio of the $Li_3PO_4$ to the $P_2S_5$ is 0.05 or more and 0.67 or less.

According to the present disclosure, by conducting mechanical milling to the raw material mixture comprising a sulfur simple substance, $P_2S_5$ and $Li_3PO_4$, wherein the molar ratio of $Li_3PO_4$ to $P_2S_5$ is in the specific range, a cathode mixture with good rate property may be obtained.

Advantageous Effects of Disclosure

The cathode mixture in the present disclosure exhibits an effect of good rate property.

DESCRIPTION OF EMBODIMENTS

Figure 1:
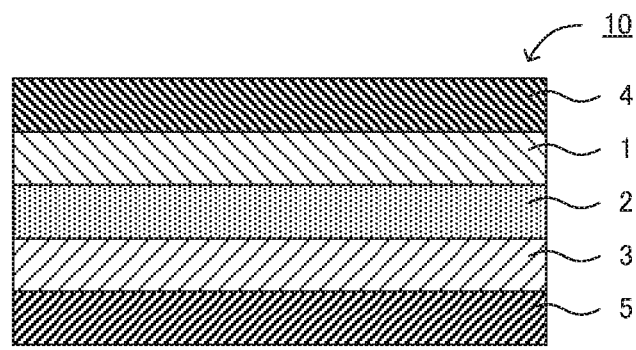
FIG. 1 is a schematic cross-sectional view illustrating an example of the all solid state battery in the present disclosure.

The cathode mixture, the all solid state battery, and the method for producing the cathode mixture in the present disclosure will be hereinafter described in detail.

A. Cathode Mixture

The cathode mixture in the present disclosure comprises a solid solution of a sulfur simple substance, $P_2S_5$ and $Li_3PO_4$, and a conductive auxiliary material, and a molar ratio of the $Li_3PO_4$ to the $P_2S_5$ is in the specific range.

According to the present disclosure, since the cathode mixture comprises the solid solution of a sulfur simple substance, $P_2S_5$ and $Li_3PO_4$, and further, the molar ratio of $Li_3PO_4$ to $P_2S_5$ is in the specific range, the rate property of the cathode mixture may be improved.

As described above, Non-Patent Literature 1 discloses a cathode mixture using a mixture of sulfur simple substance (S), $P_2S_5$, and Ketjen black as a raw material. In this cathode mixture, a solid solution is formed from the sulfur simple substance (S) and $P_2S_5$, and further, this solid solution and the Ketjen black are mutually dispersed. That is, this cathode material includes the solid solution of the sulfur simple substance (S) and $P_2S_5$, and the Ketjen black. Meanwhile, when a battery using this cathode material is discharged at relatively high rate at room temperature, the capacity tends to be low. The inventors of the present disclosure have studied for the reason thereof in detail, and found out that DC resistance becomes higher with the increase of the rate. This knowledge suggests that the ion conductivity in the cathode mixture is insufficient when it is discharged at high rate.

Meanwhile, the ion conductivity of $Li_3PO_4$ is approximately $2.3 \times 10^{-6}$ S/cm, and the ion conductivity is significantly low than most of the solid electrolyte used for a battery. Therefore, it was initially presumed that it was difficult to improve the ion conductivity in a cathode mixture even though $Li_3PO_4$ was added. However, the inventors of the present disclosure have surprisingly found out that rate property is improved by adding a small amount of $Li_3PO_4$ to raw material mixture, when producing a cathode mixture. Although the reason thereof is not completely clear, it is presumed that a new function of assisting Li intercalation to S is exhibited since the small amount of $Li_3PO_4$ is dissolved with S and $P_2S_5$. Such effect is a qualitatively different effect not conventionally known.

In the cathode mixture in the present disclosure, a molar ratio of $Li_3PO_4$ to $P_2S_5$ is usually 0.05 or more. When the molar ratio is too low, the rate property may not be improved. Meanwhile, the molar ratio is, for example, 1.2 or less, may be 0.67 or less, and may be 0.25 or less.

1. Solid Solution

The cathode mixture in the present disclosure includes a solid solution of a sulfur simple substance, $P_2S_5$ and $Li_3PO_4$. The $P_2S_5$ in the solid solution functions as an ion conducting path during charge and discharge. Li ions are conducted from the anode layer to the cathode layer via the solid electrolyte layer during discharge, and the Li ions reached at the cathode layer react with S. When $P_2S_5$ is not present in the cathode layer, the ion conductivity of the corona product (such as $Li_2S$) is low; thus the discharge reaction does not easily proceed due to lack of the ion conducting path in the cathode layer. On the other hand, when $P_2S_5$ is present in the cathode layer, the ion conducting path in the cathode layer is secured by $P_2S_5$ and thus the discharge reaction easily proceeds even if the ion conductivity of the corona product (such as $Li_2S$) is low.

Also, $P_2S_5$ is usually a compound represented by molecular formula of $P_4S_{10}$, and has a chemical structure such that four $PS_4$ structures are condensed. Therefore, the solid solution usually has $PS_4$ structure deriving from $P_2S_5$. In the solid solution, S (S in $PS_4$ structure) in $P_2S_5$ preferably has a chemical bond to the sulfur simple substance (S). Similarly, in the solid solution, S (S in $PS_4$ structure) in $P_2S_5$ preferably has a chemical bond to O (O in $PO_4$ structure) in $Li_3PO_4$. Also, in the solid solution, the sulfur simple substance (S) preferably has a chemical bond to O (O in $PO_4$ structure) in $Li_3PO_4$.

Also, in the raw material mixture, when the sulfur simple substance is present excessively to $P_2S_5$ the following situations may occur; a part of the sulfur simple substance remains not dissolved, or the dissolved sulfur simple substance is redeposited. Therefore, the cathode mixture in the present disclosure may include further sulfur simple substance besides the solid solution. Meanwhile, since $Li_3PO_4$ in the raw material mixture is small in amount, all of the $Li_3PO_4$ is usually considered to be dissolved.

The sulfur simple substance functions as the cathode active material. Examples of the sulfur simple substance may include $S_8$ sulfur. The $S_8$ sulfur has three crystal forms of α-sulfur (rhombic sulfur), β-sulfur (monoclinic sulfur), and γ-sulfur (monoclinic sulfur), and any of them may be applicable. Also, the cathode mixture may and may not have the peak of the sulfur simple substance in an XRD measurement. The typical peaks of the sulfur simple substance appear at $2θ=23.05°±0.50°$, $25.84°±0.50°$, and $27.70°±0.50°$ in an XRD measurement using a CuKα ray. These peak positions may be respectively ±0.30°, and may be ±0.10°.

Also, the cathode mixture may and may not have the peak of $P_2S_5$ in an XRD measurement. The typical peaks of $P_2S_5$ appear at $2θ=25.84°±0.50°$, $30.35°±0.50°$, and $31.32°±0.50°$ in an XRD measurement using a CuKα ray. These peak positions may be respectively ±0.30°, and may be ±0.10°.

Also, the cathode mixture may and may not have the peak of $Li_3PO_4$ in an XRD measurement. The typical peaks of $Li_3PO_4$ appear at $2θ=22.33°±0.50°$, $23.18°±0.50°$, $24.79°±0.50°$, and $33.93°±0.50°$ in an XRD measurement using a CuKα ray. These peak positions may be respectively ±0.30°, and may be ±0.10°.

2. Conductive Auxiliary Material

The conductive auxiliary material has a function of improving the electron conductivity of the cathode mixture. Also, it is presumed that the conductive auxiliary material functions as a reductant that reduces the sulfur simple substance on the occasion such as when mechanical milling is conducted to the raw material mixture. The conductive auxiliary material is preferably present in the state dispersed in the cathode mixture.

Examples of the conductive auxiliary material may include a carbon material and a metal material. Examples of the carbon material may include vapor growth carbon fiber (VGCF), acetylene black, activated carbon, furnace black, carbon nanotube, Ketjen black, and graphene. Incidentally, the content of the conductive auxiliary material in the cathode mixture is the same as the content of the conductive auxiliary material in the later described raw material mixture; thus, the description herein is omitted.

3. Cathode Mixture

The cathode mixture in the present disclosure comprises: a solid solution of a sulfur simple substance, $P_2S_5$ and $Li_3PO_4$, and a conductive auxiliary material. The proportion of the sulfur simple substance, $P_2S_5$, $Li_3PO_4$ and conductive auxiliary material are the same as the content described in "C. Method for producing cathode mixture" later. That is, same as the proportion of each material in the raw material mixture.

In the cathode mixture, there are no particular limitations on the molar ratio (P/S) of the P element to the S element; for example, it is 0.03 or more, may be 0.06 or more, may be 0.09 or more, and may be 0.12 or more. Meanwhile, the molar ratio (P/S) is, for example, 0.5 or less, may be 0.3 or less, and may be 0.15 or less. Incidentally, the denominator of the molar ratio (P/S) signifies the amount of all the S elements included in the cathode mixture; since both the sulfur simple substance and $P_2S_5$ in the present disclosure include a S element, the amount of the both S elements are summed.

B. All Solid State Battery

FIG. 1 is a schematic cross-sectional view illustrating an example of the all solid state battery in the present disclosure. All solid state battery 10 illustrated in FIG. 1 comprises cathode layer 1, solid electrolyte layer 2, and anode layer 3 in this order. All solid state battery 10 further comprises cathode current collector 4 for collecting currents of cathode layer 1, and anode current collector 5 for collecting currents of anode layer 3. Cathode layer 1 comprises the solid solution of a sulfur simple substance, $P_2S_5$ and $Li_3PO_4$, and a conductive auxiliary material, and the molar ratio of $Li_3PO_4$ to $P_2S_5$ is in the specific range.

According to the present disclosure, since the cathode layer comprises the solid solution of a sulfur simple substance, $P_2S_5$ and $Li_3PO_4$, and further, the molar ratio of $Li_3PO_4$ to $P_2S_5$ is in the specific range, the rate property of the all solid state battery may be improved.

1. Cathode Layer

The cathode layer comprises the solid solution of a sulfur simple substance, $P_2S_5$ and $Li_3PO_4$, and a conductive auxiliary material. Also, the molar ratio of $Li_3PO_4$ to $P_2S_5$ is in the specific range. The solid solution of a sulfur simple substance, $P_2S_5$ and $Li_3PO_4$, and a conductive auxiliary material, and the other items are in the same contents as those described in "A. Cathode mixture" above; thus, the descriptions herein are omitted.

The thickness of the cathode layer is, for example, 0.1 μm or more and 1000 μm or less. Also, the cathode layer may be obtained by, for example, pressing the above described cathode mixture.

2. Anode Layer

The anode layer is a layer containing at least an anode active material. The anode active material preferably includes a Li element. Examples of such an anode active material may include a lithium simple substance and a lithium alloy. Examples of the lithium alloy may include Li—In alloy.

The anode layer may contain at least one of a solid electrolyte, a conductive auxiliary material, and a binder, as required. The conductive auxiliary material is in the same contents as those described for the cathode layer above. Examples of the binder may include a fluorine-based binder such as polyvinylidene fluoride (PVDF). Also, the thickness of the anode layer is, for example, 0.1 μm or more and 1000 μm or less.

3. Solid Electrolyte Layer

The solid electrolyte layer is a layer formed between the cathode layer and the anode layer. Also, the solid electrolyte layer is a layer containing at least a solid electrolyte, and may contain a binder as required.

Examples of the solid electrolyte may include a sulfide solid electrolyte, an oxide solid electrolyte, a nitride solid electrolyte, and a halide solid electrolyte. Above all, the sulfide solid electrolyte is preferable. The sulfide solid electrolyte preferably includes a Li element, an A element (A is at least one kind of P, Ge, Si, Sn, B, and Al), and a S element. The sulfide solid electrolyte may further include a halogen element. Examples of the halogen element may include a F element, a Cl element, a Br element, and an I element. Also, the sulfide solid electrolyte may further include an O element.

Examples of the sulfide solid electrolyte may include $Li_2S$—$P_2S_5$, $Li_2S$—$P_2S_5$—LiI, $Li_2S$—$P_2S_5$—$GeS_2$, $Li_2S$—$P_2S_5$—$Li_2O$, $Li_2S$—$P_2S_5$—$Li_2O$—LiI, $Li_2S$—$P_2S_5$—LiI—LiBr, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (provided that m, n is a positive number; Z is either one of Ge, Zn, and Ga), $Li_2S$—$GeS_2$, $Li_2S$—$SiS_2$—$Li_3PO_4$, and $Li_2S$—$SiS_2$-$Li_xMO_y$ (provided that x, y is a positive number; M is either one of P, Si, Ge, B, Al, Ga, and In).

The proportion of the solid electrolyte included in the solid electrolyte layer is, for example, 50 volume % or more, may be 70 volume % or more, and may be 90 volume % or more. Incidentally, the binder to be used in the solid electrolyte layer is in the same contents as those described for the anode layer above. Also, the thickness of the solid electrolyte layer is, for example, 0.1 μm or more and 1000 μm or less.

4. All Solid State Battery

The all solid state battery in the present disclosure comprises the above described cathode layer, anode layer, and solid electrolyte layer, and usually further comprises a cathode current collector for collecting currents of the cathode layer, and an anode current collector for collecting currents of the anode layer. Examples of the material for the cathode current collector may include SUS, aluminum, nickel, iron, titanium, and carbon. On the other hand, examples of the material for the anode current collector may include SUS, copper, nickel, and carbon.

The all solid state battery in the present disclosure is preferably a sulfur battery. The sulfur battery signifies a battery using a sulfur simple substance as a cathode active material. The all solid state battery in the present disclosure is preferably a lithium sulfur battery (LiS battery). Also, the all solid state battery may be a primary battery and may be a secondary battery, but the latter is preferable among them since it may be repeatedly charged and discharged, and is useful as, for example, a car-mounted battery. Incidentally, the secondary battery includes a usage of a secondary battery as a primary battery (the use for the purpose of just one time discharge after charge).

C. Method for Producing Cathode Mixture

Figure 2:
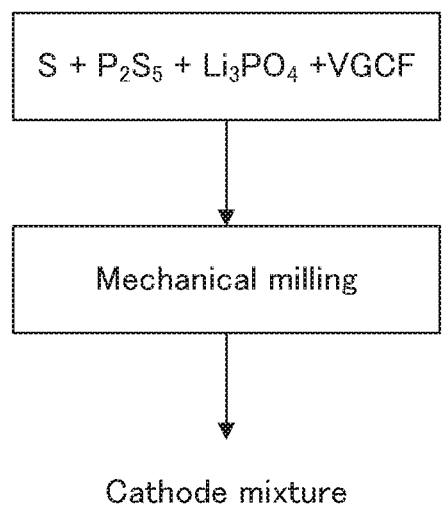
FIG. 2 is a flow chart illustrating an example of the method for producing the cathode mixture in the present disclosure.

FIG. 2 is a flow chart explaining an example of the method for producing a cathode mixture in the present disclosure. In FIG. 2, first, a mixture containing a sulfur simple substance (S), $P_2S_5$, $Li_3PO_4$, and a conductive auxiliary material (VGCF) is prepared as the raw material mixture of the cathode mixture (preparing step). Next, mechanical milling is conducted to the raw material mixture (mechanical milling step). Thereby, the cathode mixture is obtained.

According to the present disclosure, by conducting mechanical milling to the raw material mixture comprising a sulfur simple substance, $P_2S_5$ and $Li_3PO_4$, wherein the molar ratio of $Li_3PO_4$ to $P_2S_5$ is in the specific range, a cathode mixture with good rate property may be obtained.

1. Preparing Step

The preparing step is a step of preparing a raw material mixture containing a sulfur simple substance, $P_2S_5$, $Li_3PO_4$, and a conductive auxiliary material. The raw material mixture may be fabricated by one's own, and may be purchased from others.

The raw material mixture may contain just the sulfur simple substance, $P_2S_5$, $Li_3PO_4$, and the conductive auxiliary material, and may further contain an additional material. Also, the molar ratio of $Li_3PO_4$ to $P_2S_5$ is in the same contents as those described in "A. Cathode mixture" above; thus, the descriptions herein are omitted.

Also, it is preferable that the raw material mixture substantially contains no $Li_2S$ so as to inhibit the battery capacity from being degraded. Since the water resistance of $Li_2S$ is low, a battery capacity tends to be low. In contrast, the raw material mixture comprises substantially no $Li_2S$ so as to inhibit the battery capacity from being degraded. "Comprising substantially no $Li_2S$" signifies that the proportion of the $Li_2S$ in the raw material mixture is 10 weight % or less, may be 5 weight % or less, may be 3 weight % or less, may be 1 weight % or less, and may be 0 weight %.

The purity of the sulfur simple substance, $P_2S_5$ and $Li_3PO_4$ are preferably high. The raw material mixture may contain just the sulfur simple substance as the cathode active material, and may further contain an additional cathode active material. The proportion of the sulfur simple substance to all the cathode active material in the raw material mixture is, for example 50 weight % or more, may be 70 weight % or more, and may be 90 weight % or more.

The content of the sulfur simple substance in the raw material mixture is, for example, 10 weight % or more, may be 20 weight % or more, and may be 30 weight % or more. If the content of the sulfur simple substance is too little, the cathode mixture with sufficient capacity may not be obtained in some cases. Meanwhile, the content of the sulfur simple substance in the raw material mixture is, for example, 80 weight % or less, may be 70 weight % or less, and may be 60 weight % or less. If the content of the sulfur simple substance is too much, the ion conductivity and the electron conductivity in the cathode layer may be insufficient in some cases.

The content of $P_2S_5$ in the raw material mixture is, for example, 10 weight % or more, and may be 15 weight % or more. If the content of $P_2S_5$ is too little, the ion conductivity in the cathode layer may be insufficient in some cases. Meanwhile, the content of $P_2S_5$ in the raw material mixture is, for example, 80 weight % or less, and may be 70 weight % or less. If the content of $P_2S_5$ is too much, the content of the sulfur simple substance becomes relatively little, and the cathode mixture with sufficient capacity may not be obtained in some cases.

The content of $Li_3PO_4$ in the raw material mixture is, for example, 0.75 weight % or more. If the content of $Li_3PO_4$ is too little, the rate property may not be improved in some cases. Meanwhile, the content of $Li_3PO_4$ in the raw material mixture is, for example, 7.27 weight % or less, and may be 3.24 weight % or less. If the content of $Li_3PO_4$ is too much, the ion conductivity in the cathode layer may be insufficient in some cases.

The content of the conductive auxiliary material in the raw material mixture is, for example, 5 weight % or more, may be 10 weight % or more, and may be 15 weight % or more. If the content of the conductive auxiliary material is too little, the electron conductivity in the cathode layer may be insufficient in some cases. Meanwhile, the content of the conductive auxiliary material in the raw material mixture is, for example, 50 weight % or less, and may be 40 weight % or less. If the content of the conductive auxiliary material is too much, the content of the cathode active material becomes relatively little, and the cathode mixture with sufficient capacity may not be obtained in some cases.

In the raw material mixture, the weight ratio of $P_2S_5$ to the sulfur simple substance is, for example, 0.4 or more, may be 0.5 or more, and may be 0.6 or more. Meanwhile, the weight ratio is, for example, 4 or less, may be 3 or less, may be 2 or less, and may be 1.2 or less.

2. Mechanical Milling Step

The mechanical milling step is a step of conducting mechanical milling to the raw material mixture. The raw material mixture is amorphized by mechanical milling and thereby the cathode mixture comprising a solid solution of a sulfur simple substance, $P_2S_5$ and $Li_3PO_4$, and a conductive auxiliary material is obtained.

There are no particular limitations on the mechanical milling if it is a method in which the cathode mixture is mixed while applying a mechanical energy thereto, and examples thereof may include ball milling, vibration milling, turbo milling, mechano-fusion, and disc milling. Above all, planetary ball milling is particularly preferable.

The mechanical milling may be dry mechanical milling and may be wet mechanical milling. The liquid to be used in the wet mechanical milling is preferably aprotonic to the extent hydrogen sulfide is not generated. Specific examples of the aprotonic liquid may include aprotonic liquids such as polar aprotonic liquid and nonpolar aprotonic liquid.

The conditions for the mechanical milling are appropriately arranged so as to obtain the desired cathode mixture. For example, when planetary ball milling is used, the raw material mixture and balls for crushing thereof are added to a container, and the treatment is conducted with specific number of weighing table rotation number and for specific time. The weighing table rotation number is, for example, 200 rpm or more, may be 300 rpm or more, and may be 500 rpm or more. Meanwhile, the weighing table rotation number is, for example, 800 rpm or less, and may be 600 rpm or less. Also, the treatment time of the planetary ball milling is, for example, 30 minutes or more, and may be 5 hours or more. Meanwhile, the treatment time of the planetary ball milling is, for example, 100 hours or less, and may be 60 hours or less. Examples of the material of the container and ball for crushing to be used in the planetary ball milling may include $ZrO_2$ and $Al_2O_3$. The diameter of the ball for crushing is, for example, 1 mm or more and 20 mm or less. The mechanical milling is preferably conducted in an inert gas atmosphere (such as Ar gas atmosphere).

3. Cathode Mixture

The cathode mixture obtained by the above described production method is in the same contents as those described in "A. Cathode mixture" above; thus, the descriptions herein are omitted. Also, the present disclosure may also provide a cathode mixture obtained by the above described production method.

Incidentally, the present disclosure is not limited to the embodiments. The embodiments are exemplification, and any other variations are intended to be included in the technical scope of the present disclosure if they have substantially the same constitution as the technical idea described in the claim of the present disclosure and offer similar operation and effect thereto.

EXAMPLES

Hereinafter, the present disclosure will be described more specifically with reference to Examples. Incidentally, each operation such as weighing, synthesizing and drying was carried out under Ar atmosphere of dew-point of −70° C. or less, unless otherwise indicated.

Example 1

<Production of Cathode Mixture>

S (sulfur simple substance), $P_2S_5$, $Li_3PO_4$, and VGCF (carbon material, conductive auxiliary material) were weighed so that S was 1.05 g, $P_2S_5$ was 0.618 g, $Li_3PO_4$ was 0.017 g, VGCF was 0.57 g, and each raw material was kneaded in an agate mortar for 15 minutes to obtain a raw material mixture. The obtained raw material mixture was projected into a container (45 cc, made of $ZrO_2$) for planetary ball milling, further, $ZrO_2$ balls (φ=4 mm, 96 g) were projected thereinto, and the container was completely sealed. Incidentally, a container and $ZrO_2$ balls those were dried all night at 60° C. were used. The sealed container was installed to a planetary ball milling machine (P7 from Fritsch Japan Co., Ltd), and a cycle of, mechanical milling for 1 hour (weighing table rotation number of 500 rpm), 15 minutes pause, mechanical milling for 1 hour in reverse turn (weighing table rotation number of 500 rpm), and 15 minutes pause, was repeated to carry out the mechanical milling for total of 48 hours. Thereby, a cathode mixture was obtained.

<Fabrication of all Solid State Battery>

Figure 3A:
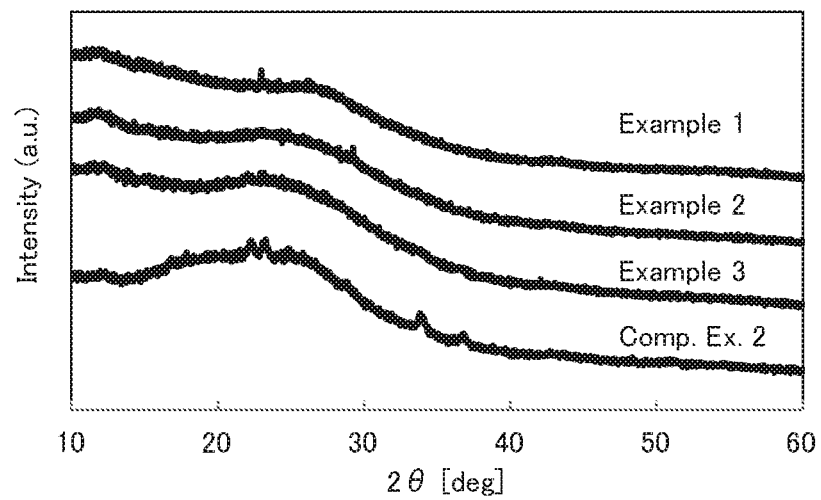
FIGS. 3A to 3C are the results of an XRD measurement for the cathode mixtures obtained in Examples 1 to 3 and Comparative Examples 1 and 2.
Figure 3B:
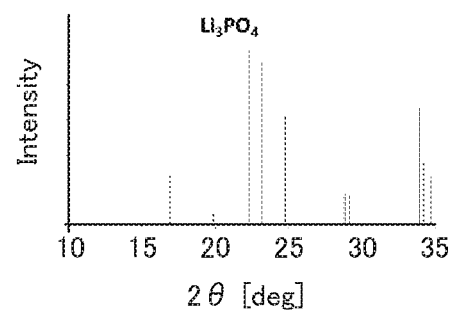
Figure 3C:
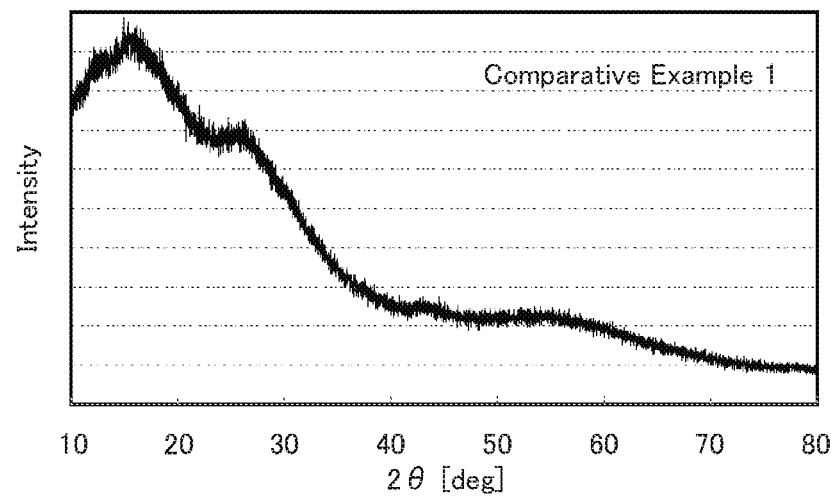

Into 1 $cm^2$ ceramic mold, 101.7 mg of a solid electrolyte ($D_{50}$=2.0 μm) was added and pressed under 1 ton/$cm^2$ to obtain a solid electrolyte layer. The obtained cathode mixture of 7.8 mg was added on one side of the obtained solid electrolyte layer and pressed under 6 ton/$cm^2$ to obtain a cathode layer. On the other side of the solid electrolyte layer, a lithium metal foil was placed as an anode layer and pressed under 1 ton/$cm^2$ to obtain a power generating element. The obtained power generating element was confined under confining pressure of 2 N·m to obtain an all solid state battery.

are shown in FIG. 3A, the results of XRD measurement for $Li_3PO_4$ are shown in FIG. 3B as a reference, and the results of XRD measurement for Comparative Example 1 wherein $Li_3PO_4$ was not used are shown in FIG. 3C. As shown in FIG. 3A and FIG. 3B, the peaks of S, $P_2S_5$, C, and also $Li_3PO_4$ were not confirmed in Examples 1 to 3. In Comparative Example 2, in contrast, the peaks of $Li_3PO_4$ were slightly confirmed. Incidentally, although a peak of an impurity was confirmed at the vicinity of 2θ=23° in Example 1, the result of a detailed analysis of the peak has revealed that the peak was not of $Li_3PO_4$. Also, as shown in FIG. 3C, the peaks of S, $P_2S_5$, and C were not confirmed in Comparative Example 1.

<Charge and Discharge Test>

A charge and discharge test was conducted for the all solid state batteries obtained in Examples 1 to 3 and Comparative Examples 1, 2. By using a medium current charge/discharge system (manufactured by Hokuto Denko Corporation), the charge and discharge test was conducted under the conditions shown in Table 2. Incidentally, the measurement temperature was 25° C.

TABLE 2

| Cycle | Charge | Pause | Discharge | Pause | Discharge | Pause |
|---|---|---|---|---|---|---|
| 1 | — | — | 0.1 C, 1.5 V | 10 min | — | — |
| 2-6 | 0.1 C, 3.1 V | 10 min | 0.1 C, 1.5 V | 10 min | — | — |
| 7 | 0.1 C, 3.1 V | 10 min | C/3, 1.5 V | 10 min | 0.1 C, 1.5 V | 10 min |
| 8 | 0.1 C, 3.1 V | 10 min | 1 C, 1.5 V | 10 min | 0.1 C, 1.5 V | 10 min |
| 9 | 0.1 C, 3.1 V | 10 min | 2 C, 1.5 V | 10 min | 0.1 C, 1.5 V | 10 min |
| 10 | 0.1 C, 3.1 V | 10 min | 0.1 C, 1.5 V | 10 min | — | — |

Examples 2, 3 and Comparative Examples 1, 2

An all solid state battery was obtained in the same manner as in Example 1 except that the composition of the raw material mixture was changed to the composition shown in Table 1. Incidentally, the compositions based on weight % and the compositions based on mol % are also shown in Table 1.

TABLE 1

| | Comp. Ex. 1 | Example 1 | Example 2 | Example 3 | Comp. Ex. 2 |
|---|---|---|---|---|---|
| S [g] | 1.05 | 1.05 | 1.05 | 1.05 | 1.05 |
| $P_2S_5$ [g] | 0.635 | 0.618 | 0.562 | 0.471 | 0.287 |
| $Li_3PO_4$ [g] | 0 | 0.017 | 0.073 | 0.164 | 0.348 |
| C [g] | 0.57 | 0.57 | 0.57 | 0.57 | 0.57 |
| S [wt %] | 46.6 | 46.6 | 46.6 | 46.6 | 46.6 |
| $P_2S_5$ [wt %] | 28.2 | 27.4 | 24.9 | 20.9 | 12.7 |
| $Li_3PO_4$ [wt %] | 0 | 0.75 | 3.24 | 7.27 | 15.43 |
| C [wt %] | 25.3 | 25.3 | 25.3 | 25.3 | 25.3 |
| S [mol %] | 39.4 | 39.4 | 39.3 | 39.1 | 38.7 |
| $P_2S_5$ [mol %] | 3.4 | 3.3 | 3.0 | 2.5 | 1.5 |
| $Li_3PO_4$ [mol %] | 0 | 0.2 | 0.8 | 1.7 | 3.6 |
| C [mol %] | 57.2 | 57.1 | 57.0 | 56.7 | 56.2 |
| $Li_3PO_4/P_2S_5$ [Molar ratio] | 0 | 0.05 | 0.25 | 0.67 | 2.33 |

[Evaluation]

<XRD Measurement>

Figure 4:
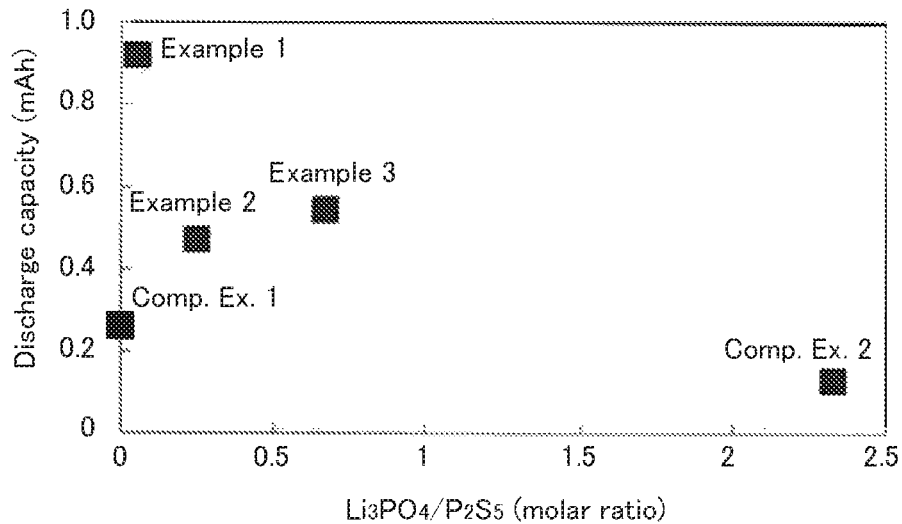
FIG. 4 is the result of a charge/discharge test for the all solid state batteries obtained in Examples 1 to 3 and Comparative Examples 1 and 2.
Figure 5A:
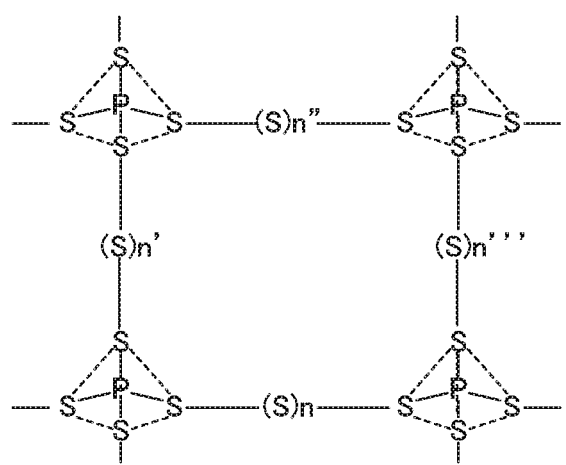
FIGS. 5A and 5B are explanatory views explaining the effects of the present disclosure.

An XRD (X-ray diffraction) measurement was conducted for the all solid state battery obtained in Examples 1 to 3 and Comparative Examples 1, 2. The results are shown in FIGS. 3A to 3C. The results of XRD measurement for Examples 1 to 3 and Comparative Example 2 wherein $Li_3PO_4$ was used The discharging capacity (discharging capacity at 1C) of the eighth cycle was determined. The results are shown in FIG. 4. As shown in FIG. 4, compared to Comparative Examples 1, 2, it was confirmed that higher discharging capacity was obtained in Examples 1 to 3. The presumed mechanism for obtaining higher discharging capacity in Examples 1 to 3 than Comparative Example 1 will be explained in referring to FIGS. 5A and 5B. FIG. 5A is an explanatory view explaining the solid solution (solid solution using the raw material mixture not including $Li_3PO_4$) obtained in Comparative Example 1, and FIG. 5B is an explanatory view explaining the solid solution (solid solution using the raw material mixture including $Li_3PO_4$) obtained in Examples 1 to 3.

Here, when high energy is applied to the raw material mixture by the mechanical milling, S (sulfur simple substance) is incorporated into $P_2S_5$. On this occasion, as shown in FIG. 5A, a situation such that a cross-linked sulfur (Sn, Sn', Sn", Sn''') deriving from S (sulfur simple substance) intervenes between $PS_4$ structures, is believed to arise. Incidentally, $P_2S_5$ is usually a compound represented by molecular formula of $P_4S_{10}$, and has a chemical structure such that four $PS_4$ structures are condensed. When S (sulfur simple substance) is dissolved, the above described condensation is resolved by S (sulfur simple substance), and a situation such that a cross-linked sulfur intervenes between $PS_4$ structures, is believed to arise. Also, the n value in the cross-linked sulfur (Sn, Sn', Sn", Sn''') is believed to be, for example, 7 or less respectively independent.

Figure 5B:
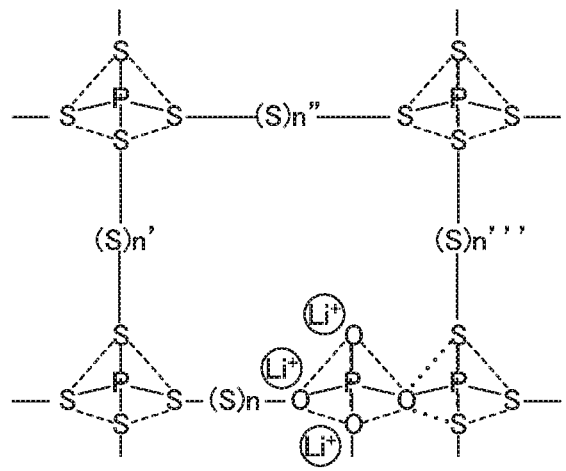

Meanwhile, when the raw material mixture includes $Li_3PO_4$, $Li_3PO_4$ is also incorporated into $P_2S_5$, as shown in FIG. 5B. On this occasion, the availability of S is believed to be improved since a situation that $Li_3PO_4$ intervenes between Sn and $PS_4$ structure arises, the $Li^+$ carrier concentration is increased in the vicinity of Sn, and the intercalation of $Li^+$ into S is facilitated. In other words, it is believed that $Li_3PO_4$ has assisted the Li intercalation into S. It is presumed that, even when discharged at relatively high rate, good discharging capacity was obtained as the result of the above. Incidentally, as shown in FIG. 5B, there is a possibility of arising a situation wherein $PO_4$ structure and $PS_4$ structure share an O element.

Meanwhile, the reason why the discharging capacity in Comparative Example 2 was low is presumed that the ion conductivity in the cathode layer was lowered since the proportion of $Li_3PO_4$ low in ion conductivity was too high. In contrast, it was confirmed that a cathode mixture with good rate property was obtained by setting the molar ratio of $Li_3PO_4$ to $P_2S_5$ in the specific range, as in Examples 1 to 3.

REFERENCE SIGNS LIST 1 cathode layer
2 solid electrolyte layer
3 anode layer
4 cathode current collector
5 anode current collector
10 all solid state battery

What is claimed is:

1. A cathode mixture comprising:
    a solid solution of a sulfur simple substance, $P_2S_5$ and $Li_3PO_4$, and
    a conductive auxiliary material, and
    a molar ratio of the $Li_3PO_4$ to the $P_2S_5$ is 0.05 or more and 0.67 or less.
2. The cathode mixture according to claim 1, comprising a carbon material as the conductive auxiliary material.
3. An all solid state battery comprising a cathode layer, a solid electrolyte layer, and an anode layer in this order, and
    the cathode layer includes a solid solution of a sulfur simple substance, $P_2S_5$ and $Li_3PO_4$, and a conductive auxiliary material, and
    a molar ratio of the $Li_3PO_4$ to the $P_2S_5$ is 0.05 or more and 0.67 or less.
4. A method for producing a cathode mixture, the method comprising steps of:
    a preparing step of preparing a raw material mixture including a sulfur simple substance, $P_2S_5$, $Li_3PO_4$, and a conductive auxiliary material, and
    a mechanical milling step of conducting mechanical milling to the raw material mixture, and
    a molar ratio of the $Li_3PO_4$ to the $P_2S_5$ is 0.05 or more and 0.67 or less.

* * * * *